Patented June 6, 1933

1,912,639

UNITED STATES PATENT OFFICE

EMMET F. HITCH AND CRAYTON K. BLACK, OF WILMINGTON, DELAWARE, ASSIGNORS TO E. I. DU PONT DE NEMOURS & COMPANY, OF WILMINGTON, DELAWARE, A CORPORATION OF DELAWARE

SEPARATION OF 1:5 FROM 1:8 AMINO-NAPHTHALENE MONO-SULPHONIC ACIDS

No Drawing.   Application filed September 11, 1930.   Serial No. 481,354.

This invention relates to a process for the separation and isolation of 1-amino-naphthalene-8-sulphonic acid and 1-amino-naphthalene-5-sulphonic acid.

These compounds are usually prepared in the following manner. Naphthalene is sulphonated to produce alpha-naphthalene-sulphonic acid. This product is then mono-nitrated resulting in the production of a mixture of 1-nitro-naphthalene-8-sulphonic acid and 1-nitro-naphthalene-5-sulphonic acid. Thereafter this mixture is reduced in order to obtain the corresponding amino-sulphonic acids.

This invention has for an object the production of a new process for the separation and isolation of 1-amino-naphthalene-8-sulphonic acid and 1-amino-naphthalene-5-sulphonic acid from a mixture of the two. Further objects are to produce these acids having a high degree of purity without the necessity of a special purification step, to produce a more economical process for the separation of these compounds and in general to advance the art. Other objects will appear hereinafter.

These objects are accomplished by the present invention whereby an alkaline solution of 1-amino-naphthalene-8-sulphonic acid, hereinafter called by its trade name "Peri acid", and 1-amino-naphthalene-5-sulphonic acid, hereinafter called by its trade name "Laurent's acid", is acidified until a pH value of 4 to 4.6 is obtained. This results in the precipitation of Peri acid. Thereafter the Peri acid is separated and the liquor containing Laurent's acid is further acidified until the pH value is below 4 whereupon Laurent's acid is precipitated and is thereafter separated.

The invention will be readily understood from a consideration of the following examples in which the parts are given by weight.

Example I

Five hundred (500) parts of an alkaline Peri reduction liquor (resulting from the reduction of nitrated naphthalene alpha-sulphonic acid) was filtered. The resultant liquor containing approximately 10 to 20 parts of Peri acid and 4 to 7 parts of Laurent's acid was run into a quantity of sulphuric acid pre-calculated to bring the pH value of the system to approximately 4.5. The quantity of acid required was calculated by titrating a small sample of the Peri reduction liquor with a standard solution of sulphuric acid. Upon proper acidification of the Peri reduction liquor the Peri acid was precipitated and it was thereafter separated by filtration. The filtered mass was washed until free from acidity to Peri purple paper. The filtrate and washings were collected and sulphuric acid added until it was strongly acid to Congo red paper. This caused the precipitation of the Laurent's acid present. The Laurent's acid was separated by filtration and washed until no longer acid to Congo red paper.

Example II

This example was carried out similarly to Example I with the exception that the sulphuric acid was added gradually to a batch of Peri reduction liquor until the proper pH value was obtained. The Peri acid precipitated as in Example I and was separated by filtration. The isolation of the Laurent's acid was effected in a manner similar to that described in Example I.

Example III

Peri reduction liquor and sulphuric acid were run into a suitable vessel simultaneously. The proportions were so regulated that a pH value of 4.5 was maintained. The isolation of Peri and Laurent's acids was accomplished by the method set out in Example I.

The hydrogen ion concentration of the solutions utilized in this invention may be satisfactorily determined by electrometric or colorimetric hydrogen ion concentration apparatus or with indicator papers.

For the first acidification a satisfactory indicator paper is Peri purple. This is the name applied to the dye para-sulpho-methoxy-benzeneazo-di-methyl-alpha-naphthylamine. It may be used when dissolved in water or when applied to paper. It changes from cream color to lavender at a pH value of 4.5. It has been found that the precipitation of Peri acid is complete at a pH value of 4.6 and that the precipitation of Laurent's acid does not begin until a pH value of 4 has been reached in the process of acidification. It will therefore be obvious that when the reduction liquor is just acid to the indicator paper mentioned that the precipitation of Peri acid is complete.

In determining the proper acidity for the precipitation of Laurent's acid Congo red paper may be used. This indicator paper changes from red to blue when a pH value of approximately 3–4 is reached. Obviously, then when the solution is acid to Congo red paper the precipitation of Laurent's acid is complete.

In either acidification if the end point is overrun sodium hydroxide or other alkali may be added to bring about the proper pH value. Such balancing of the acidity has no harmful effect upon the ingredients. The operations may be effected at any temperature from 0 to 100° C. Any acid which will produce a pH value of 4 to 4.6 in the solution may be used successfully. This invention has as an advantage the separation of Peri and Laurent's acids in a very pure state, suitable for commercial use without further purification. It is possible that minute quantities of other isomers result from the process of production of these acids. When the separation of Peri and Laurent's acids is made these impurities or isomeric compounds, are, in all probability, precipitated with the Laurent's acid, if at all. It does not appear that any other substances are precipitated with the Peri acid which is therefore isolated in an especially pure form.

As many apparently widely different embodiments of this invention may be made without departing from the spirit and scope thereof it is to be understood that we do not limit ourselves to the specific embodiments thereof except as defined in the appended claims.

We claim:

1. A process for the separation and isolation of 1-amino-naphthalene-8-sulphonic acid and 1-amino-naphthalene-5-sulphonic acid from an alkaline solution of a mixture of these two acids which consists in adjusting the hydrogen ion concentration of the system to a pH value between 4.0 and 4.6, filtering off the precipitated 1-amino-naphthalene-8-sulphonic acid, adding acid to the filtrate until an acid reaction to Congo red paper is obtained and filtering off the precipitated 1-amino-naphthalene-5-sulphonic acid.

2. A process for the separation and isolation of 1-amino-naphthalene-8-sulphonic acid and 1-amino-naphthalene-5-sulphonic acid from an alkaline solution of a mixture of these two acids which consists in adding this alkaline solution to an amount of acid which will bring the hydrogen ion concentration of the system to a pH value between 4.0 and 4.6, filtering off the precipitated 1-amino-naphthalene-8-sulphonic acid, adding acid to the filtrate until an acid reaction to Congo red paper is obtained and filtering off the precipitated 1-amino-naphthalene-5-sulphonic acid.

3. A process for the separation and isolation of 1-amino-naphthalene-8-sulphonic acid and 1-amino-naphthalene-5-sulphonic acid from an alkaline solution of a mixture of these two acids which consists in adding acid to this alkaline solution until the hydrogen ion concentration of the system shows a pH value between 4.0 and 4.6, filtering off the precipitated 1-amino-naphthalene-8-sulphonic acid, adding acid to the filtrate until a pH value below 4 is obtained and filtering off the precipitated 1-amino-naphthalene-5-sulphonic acid.

4. The process with comprises adding an acid to an alkaline solution obtained by mono-sulphonating naphthalene, mono-nitrating this product and reducing the resultant to reduce the pH value to between 4 and 4.6, and separating the solid material precipitated.

5. The process which comprises adding an acid to an alkaline solution obtained by mono-sulphonating naphthalene, mono-nitrating this product and reducing the resultant to reduce the pH value to between 4 and 4.6, separating the solid material precipitated, further reducing the pH value to below 4, and separating the solid material precipitated.

6. The process of separating Peri and Laurent's acids which comprises reducing the pH value of an alkaline solution of a mixture of the two, to 4 to 4.6, separating the Peri acid, further reducing the pH value to below 4, and separating the solid Laurent's acid.

7. In the production of Peri acid which comprises mono-nitrating and reducing naphthalene-alpha-sulphonic acid, the steps of reducing the pH value of the alkaline reduction liquor to between 4 and 4.6 and separating the precipitated Peri acid.

8. The process of producing Laurent's acid which comprises alpha-sulphonating naphthalene, mono-nitrating the sulphonated product, reducing the sulphonated and nitrated product, reducing the pH value of the alkaline reduction liquor to between 4 and 4.6, separating the solid precipitated, further reducing the pH value of the reduction liquor to precipitate Laurent's acid and separating the Laurent's acid precipitated.

9. The process of separating 1-amino-naphthalene-8-sulphonic acid and 1-amino-naphthalene-5-sulphonic acid which comprises forming an alkaline solution of the two, reducing the pH value until the 1-amino-8-naphthalene-sulphonic acid precipitates, separating said product and further reducing the pH value of the solution until the 1-amino-naphthalene-5-sulphonic acid precipitates and separating said product.

10. The process which comprises alpha-sulphonating naphthalene, mono-nitrating this product and reducing the resultant, thereafter treating the alkaline solution with an acidifying substance until the solution just changes the color of Peri purple, separating the precipitated 1-amino-naphthalene-8-sulphonic acid, washing the product, adding the wash water to the original solution, treating the resultant solution with an acidifying substance until the solution changes the color of Congo red and separating the precipitated material.

11. The process of separating a mixture of 1:8 and 1:5 disubstituted naphthalenes containing a sulphonic acid group which comprises adding acid to an alkaline solution of the two until one precipitates, separating it, adding more acid to the solution until the other precipitates and separating it.

12. The process of separating a mixture of 1:8 and 1:5-amino-naphthalene-mono-sulphonic acids which comprises adding acid to an alkaline solution of the two until one precipitates, separating it, adding more acid to the solution until the other precipitates, and separating it.

13. The process of separating 1:8 and 1:5-amino-naphthalene-mono-sulphonic acids which comprises adjusting the hydrogen ion concentration of a solution of the two until one precipitates, separating it, adjusting the hydrogen ion-concentration of the remaining solution until the other precipitates and separating it.

14. A process for the separation and isolation of 1-amino-naphthalene-8-sulphonic acid and 1-amino-naphthalene-5-sulphonic acid from an alkaline solution of a mixture of these two acids which consists in adjusting the hydrogen ion concentration of the system to a pH value between 4.0 and 4.6, filtering off the precipitated 1-amino-naphthalene-8-sulphonic acid, adding acid to the filtrate until a pH value of 3-4 is obtained and filtering off the precipitated 1-amino-naphthalene-5-sulphonic acid.

15. The process of separating Peri and Laurent's acids which comprises adjusting the pH value of a solution of a mixture of the two, to 4 to 4.6, and separating the Peri acid precipitated.

16. The process which comprises adjusting the hydrogen ion concentration of a solution containing both 1-amino-naphthalene-8-sulphonic and 1-amino-naphthalene-5-sulphonic acid radicals so that the Peri purple used as an indicator is just on the lavender side and separating the precipitate which comprises the 1-amino-naphthalene-8-sulphonic acid.

17. The process which comprises adding a mineral acid to an alkaline solution obtained by mono-sulphonating naphthalene, mono-nitrating this product and reducing the resultant to reduce the pH value to between 4 and 4.6 and separating the solid material precipitated.

In testimony whereof we affix our signatures.

EMMET F. HITCH.
CRAYTON K. BLACK.